United States Patent [19]

Adamowicz et al.

[11] Patent Number: 4,549,931

[45] Date of Patent: * Oct. 29, 1985

[54] INORGANIC BINDERS FOR ARTICLES FORMED FROM FIBERS

[75] Inventors: John A. Adamowicz, Corning; John R. Schlup, Horseheads; Mark S. Spotz, Corning, all of N.Y.

[73] Assignee: Corning Glass Works, Corning, N.Y.

[*] Notice: The portion of the term of this patent subsequent to Jun. 12, 2001 has been disclaimed.

[21] Appl. No.: 461,673

[22] Filed: Jan. 27, 1983

[51] Int. Cl.$^4$ .............................................. D21H 3/78
[52] U.S. Cl. .................................... 162/145; 162/146; 162/152; 162/181.1; 162/181.4; 162/181.5; 162/158; 162/179
[58] Field of Search ............ 162/152, 156, 181, 181.4, 162/181.5, 145, 146, 158, 179; 106/DIG. 3

[56] References Cited

U.S. PATENT DOCUMENTS

| | | | |
|---|---|---|---|
| 3,001,571 | 9/1961 | Hatch | 162/152 |
| 3,066,066 | 11/1962 | Keim et al. | 162/152 |
| 4,239,519 | 12/1980 | Beall et al. | 65/30.14 |
| 4,308,093 | 12/1981 | Bodendorf et al. | 162/152 |
| 4,454,237 | 6/1984 | Hoda et al. | 106/DIG. 3 |
| 4,455,382 | 6/1984 | Wu | 106/DIG. 3 |

*Primary Examiner*—William F. Smith
*Attorney, Agent, or Firm*—C. S. Janes, Jr.

[57] ABSTRACT

The present invention is directed to the production of articles exhibiting high mechanical strengths which are relatively insensitive to changes in relative humidity. The articles consist essentially of organic and/or inorganic fibers and a binder, the binder being composed of the product of reaction between an organic polycation, and/or an aminosilane, and/or an organic chrome complex and crystals of a lithium and/or sodium water-swelling mica selected from the group of fluorhectorite, hydroxyl hectorite, boron fluorphlogopite, hydroxyl boron phlogopite, and solid solutions among those and between those and other structurally-compatible species selected from the group of talc, fluortalc, polylithionite, fluorpolythionite, phlogopite, and fluorphlogopite.

7 Claims, No Drawings

INORGANIC BINDERS FOR ARTICLES FORMED FROM FIBERS

BACKGROUND OF THE INVENTION

Materials suitable for such applications as electrical insulation, heat insulation, sound insulation, and decorative building elements consisting essentially of ceramic fibers bonded into an article of a desired geometry utilizing an organic or inorganic binder have been marketed commercially for many years. Depending upon the destined application, which can range from acoustic ceiling tile to wrappings for liquid-carrying pipes, the ceramic fibers employed have included such widely-varying materials as asbestos, calcium sulfate, fiber glass, mica, perlite, cellulose, and mineral wool, to name but a few of the most common.

It is quite apparent that the strength imparted to the final article by the binder is of great significance. The chemical durability and weathering resistance of the binder are also highly important and, where highly elevated temperatures are to be experienced, the binder must demonstrate sufficient refractoriness and heat stability. The use of an inorganic binder generally removes the threat of flammability inherent in the use of organic bonding media.

U.S. Pat. No. 4,239,519 discloses the production of inorganic, crystal-containing gels which perform as precursors for the preparation of papers, fibers, films, boards, and coatings. The patented method for developing the gels contemplates three basic elements: first, a fully or predominantly crystalline body (most preferably a glass-ceramic body) is formed which contains crystals consisting essentially of a lithium and/or sodium water-swelling mica selected from the group of fluorhectorite, hydroxyl hectorite, boron fluorphlogopite, hydroxyl boron phlogopite, and solid solutions among those and between those and other structurally-compatible species selected from the group of talc, fluortalc, polylithionite, fluorpolylithionite, phlogopite, and fluorphlogopite; second, that crystalline body is contacted with a polar liquid, customarily water, to cause swelling and disintegration of the body accompanied with the formation of a gel; and, third, the solid:liquid ratio of the gel is adjusted to a desired value depending upon the utility to which the final product is to be placed.

The crystals developed following the disclosure of U.S. Pat. No. 4,239,519 demonstrate a morphology of a continuum of flakes, rectangular-like strips, and interwoven ribbons in parallel or sub-parallel zones or sheaths with said flakes being irregularly shaped with diameters between about 0.5–10 microns and cross sections of less than 100 Å, and said strips and ribbons being about 0.5–10 microns long, about 500–5000 Å wide, and less than about 100 Å thick. That morphology yields crystals displaying a very high aspect ratio, higher than naturally-occurring mica, and large surface area, both of those characteristics rendering the materials useful for reinforcing various matrices.

Good chemical durability is endowed to the papers, fibers, films, boards, coatings, etc., prepared from the gels by contacting those products with a source of large cations to effect flocculation of the gel and an ion exchange reaction to occur between the large cations and the $Li^+$ and/or $Na^+$ ions from the interlayer of the crystals, and then washing and drying the resulting materials. The patent observed the utility of $K^+$, $Rb^+$, $Cs^+$, $Ag^+$, $Cu^+$, $NH_4^+$, $H_3O^+$, $Ca^{+2}$, $Sr^{+2}$, $Ba^{+2}$, $Pb^{+2}$, and certain organic polycations, specifically reciting aniline hydrochloride and quaternary ammonium compounds as illustrative of operable large cations.

If desired, the ion exchange reaction may be carried out with the gel, i.e., before paper, fibers, films, boards, coatings, or other products are formed therefrom, or it may be conducted during the actual forming process for the product. However, no matter at what juncture the ion exchange reaction is undertaken, its occurrence is unequivocally required to prevent spontaneous degradation of the products in the presence of water.

Where products produced in accordance with that patent have been subjected to long term testing, it has been discovered that such physical properties thereof as mechanical strength, dielectric strength, loss tangent, and ionic conductivity are deleteriously affected by an atmosphere of high relative humidity. Thus, the physical characteristics exhibited by those products are not permanently stable in the presence of moisture.

U.S. application Ser. No. 461,672, filed concurrently herewith in the name of Shy-Hsien Wu under the title ORGANIC-INORGANIC COMPOSITES OF NEUTRALIZED POLYELECTROLYTE COMPLEXES now U.S. Pat. No. 4,455,382 and U.S application Ser. No. 461,571, also filed concurrently herewith in the names of S. N. Hoda and A. R. Olszewski under the title ORGANIC-INORGANIC COMPOSITES CONTAINING SYNTHETIC MICA, now U.S. Pat. No. 4,454,237 have for their objectives the development of means for rendering products produced in accordance with the method of U.S. Pat. No. 4,239,519 relatively insensitive to changes in relative humidity in the surrounding environment.

The basis of the first disclosure lies in the discovery that a neutralized polyelectrolyte complex can be prepared via the reaction of an anionic gel prepared in the manner described in U.S. Pat. No. 4,239,519 with an equivalent amount of an organic polycation. Such a complex, when formed into paper, fiber, film, board, or coating, displays exceptional toughness, excellent hydrophobicity, high mechanical strength, and good electrical properties. And, because of the resistance of the products to attack by moisture, the physical characteristics thereof are quite insensitive to variations in relative humidity of the atmospheres to which they are exposed. The exceptional hydrophobic character exhibited by the products of Ser. No. 461,672 is acquired through the formation of a strong polycation-polyanion interaction. Moreover, the long chain nature of a polycation imparts high strength and toughness to the composites, since the polycation can react with itself and/or with adjoining chains upon curing.

As is mentioned in Ser. No. 461,672, ion exchange of an organic polycation with an anionic gel was cursorily alluded to in U.S. Pat. No. 4,239,519. Nevertheless, there was no teaching in the patent of the criticality for maintaining charge neutrality in the exchanged system. In contrast, charge neutrality comprises the very crux of the inventive materials disclosed in Ser. No. 461,672. That is, each of the exceptionally desirable chemical and physical properties exhibited by the inventive materials can be laid to the organic polycations reaction with an equivalent quantity of inorganic polyanions' (gels) to form a neutralized polyelectrolyte complex. In sum, any significant movement away from charge neutrality yields a polyelectrolyte complex system which is virtually of no practical utility because of its high sensitivity to deterioration in a moisture-laden environment.

The inventive method disclosed in Ser. No. 461,672 to produce paper, fiber, film, board, or coating involves six general steps:

(a) a fully or predominantly crystalline body is prepared according to the practice described in U.S. Pat. No. 4,239,519 and having an overall composition and microstructure as disclosed in that patent;

(b) that body is contacted with a polar liquid, customarily water, for a period of time sufficient to cause swelling and disintegration thereof accompanied with the formation of a gel having crystals dispersed therewithin;

(c) that gel is contacted with a source of organic polycations in an amount and for a time sufficient to cause an ion exchange reaction to take place between the organic polycations and the $Li^+$ and/or $Na^+$ ions from the interlayer of the above-noted crystals and to neutralize the charge density of those crystals, thereby promoting the formation of a neutralized polyelectrolyte complex;

(d) that complex, normally existing in the form of floc, is dispersed into a liquid selected from the group of polar organic liquids, aqueous $NH_4OH$ solutions, and aqueous salt solutions of large cations selected from the group of $K^+$, $Rb^+$, $Cs^+$, $Ag^+$, $Cu^+$, $NH_4^+$, $Ca^{+2}$, $Sr^{+2}$, and $Pb^{+2}$;

(e) the solid:liquid ratio of the complex and liquid is adjusted to a desired fluidity; and (f) paper, fiber, film, board, or coating is prepared therefrom.

Formamide is noted as being the preferred organic liquid dispersing solution and aqueous solutions of KCl and $NH_4OH$ as the preferred inorganic dispersants.

Ser. No. 461,672 discloses and describes three categories of organic cations which are operable in that invention, viz., $N^+$, $P^+$ and $S^+$. The most common of those is $N^+$, of which there are four types:

(1) a primary amine solubilized with acid, exemplified by $$R-NH_3^+X^-;$$

(2) a secondary amine solubilized with acid, illustrated by

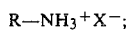

(3) a tertiary amine solubilized with acid, represented by

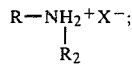

(4) a quaternary ammonium acid salt, designated by

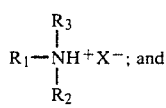

wherein the cationic characteristic increases from the primary amine up to the quaternary cation.

Illustrative of the $P^+$ cation is the quaternary phosphonium acid salt

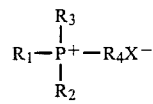

The $S^+$ cation is represented by the ternary sulfonium acid salt

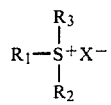

The most preferred source of organic polycations disclosed in Ser. No. 461,672 is stated to be KYMENE 557H solution, marketed by Hercules, Incorporated. That material is described as a cationic, water soluble condensate of a basic polyamide and epichlorohydrin which has assumed a polyamide-polyamine-epichlorohydrin resin form. Other operable polyquaternary ammonium salts cited in Ser. No. 461,672 include ACCOSTRENGTH 711, marketed by American Cyanamid Company, Wayne, N.J., and NALCOLYTE 7134, marketed by Nalco Chemical Company, Chicago, Ill.

The inventive method disclosed in Ser. No. 461,571 to produce composite articles of various geometries such as paper, fiber, film, board or coating utilizes five general steps:

(1) a fully or predominantly crystalline body is formed according to the method disclosed in U.S. Pat. No. 4,239,519 and having an overall composition and microstructure as defined in that patent;

(2) that body is contacted with a polar liquid, conveniently water, for a period of time sufficient to cause swelling and disintegration thereof accompanied with the production of a gel having crystals dispersed therewithin;

(3) that gel is contacted with a source of organic cations selected from the group of aminosilanes and organic chrome complexes in an amount and for a time sufficient to cause an ion exchange reaction to take place between said cations and $Li^+$ and/or $Na^+$ ions from the interlayer of said crystals;

(4) the solid:liquid ratio of the exchanged gel and the liquid is adjusted to a desired fluidity; and (5) paper, fiber, film, board, or coating is prepared therefrom.

Ser. No. 461,571 discloses Z6020, N-$\beta$-aminoethyl-$\gamma$-aminopropyl trimethoxy silane, marketed by Dow Corning Corporation, Midland, Mich., as illustrative of an operable aminosilane, and teaches suitable organic chrome complexes as being selected from the group of a chemically reactive Werner complex, methacrylato chromic chloride, wherein methacrylic acid is coordinated with chromium (VOLAN), and a chemically reactive Werner complex wherein a $C_{14}$-$C_{18}$ fatty acid is coordinated with trivalent chromium (QUILON C), both marketed by E. I. DuPont de Nemours & Co., Wilmington, Del.

U.S. Pat. No. 4,239,519 is primarily concerned with the use of glass-ceramics as starting materials for producing crystal-containing gels. Several other means for producing operable starting materials are available, however.

For example, "Fluorine Micas", *Bureau of Mines Bulletin* 647, pages 236–242 (1969) describes sintering and recrystallizing a batch composed of raw materials such as talc, silica, magnesia, and fluoride in the proper proportions to form water-swelling fluormicas that can be utilized to make inorganic paper.

As an alternative to that simple reaction sintering practice, a synthetic lithium and/or sodium water-swelling, gel-forming material can be prepared by firing a batch of a predetermined composition in an autoclave. As illustrative of that technique, a lithium fluormica can be produced by hydrothermally treating a batch compounded from talc, a source of silica such as silicic acid or powdered silica, lithium silicate, magnesia, lithia, and fluorides of lithium, magnesium, or ammonium in the proper proportions to yield the stoichiometry of the desired lithium fluormica.

In yet another method, magnesium and silica-containing species are co-precipitated in the presence of $Li^+$, $Na^+$, and $F^-$ ions and that precipitate subjected to a hydrothermal treatment. In a variation of that technique, $SiO_2$ is precipitated into a preformed aqueous suspension of a water insoluble magnesium compound. That mass is then subjected to a hydrothermal treatment in the presence of excess lithium or sodium compounds.

As can be observed, each of those methods requires the batch constituents to be present in such amounts that the reaction product will approximate a desired stiochiometry.

SUMMARY OF THE INVENTION

We have found that, by modifying the processes disclosed in Ser. No. 461,672 and Ser. No. 461,571, a binder system can be developed for fabricating articles formed from inorganic and/or organic fibers such that the resulting products demonstrate relatively high mechanical strength when exposed to atmospheres of low and high relative humidity along with exceptional heat stability where inorganic fibers are employed. In essence, the inventive binder system demands the presence of two basic materials:

(a) a lithium and/or sodium water-swelling mica selected from the group of fluorhectorite, hydroxyl hectorite, boron fluorphlogopite, hydroxyl boron phlogopite, and solid solutions among those and between those and other structurally-compatible species selected from the group of talc, fluortalc, polylithionite, fluorpolylithionite, phlogopite, and fluorphlogopite; and (b) a source of organic polycations, aminosilanes, and/or organic chrome complexes.

Whereas glass-ceramics prepared in accordance with the disclosure of U.S. Pat. No. 4,239,519 are deemed to constitute the preferred starting materials because of the inherent capability of the glass-ceramic process for carefully controlling the microstructure and crystal identity of the body plus obtaining crystals of relatively uniform signs, the inventive binder system is operable with any synthetic lithium or sodium water-swelling mica of the type described above in paragraph (a).

The organic polycations disclosed in Ser. No. 461,672 are quite suitable in the present invention. Thus, organic polycations operable in the present invention are selected from the group of:

(1) a primary amine solubilized with acid;
(2) a secondary amine solubilized with acid;
(3) a tertiary amine solubilized with acid;
(4) a quaternary ammonium acid salt;
(5) a quaternary phosphonium acid salt; and
(6) a ternary sulfonium acid salt.

For a more complete discussion of those organic polycations, attention is directed to Ser. No. 461,672, the disclosure of which is incorporated herein by reference.

In like manner, the aminosilanes and organic chrome complexes described in Ser. No. 461,571 are operable in the present inventive method and the disclosure of that application is also specifically incorporated herein by reference.

In general, the starting materials will consist essentially, expressed in terms of weight percent on the oxide basis, of $Li_2O$:0–12
$Na_2O$:0–10
$Li_2O + Na_2O$:0.5–14
MgO: 10–38
$B_2O_3$:0–30
$Al_2O_3$:0–10
$SiO_2$:35–70
F:0–15
OH:0–15
F+OH:4–15 with the preferred compositions consisting essentially of $Li_2O$:0.5–12
$Na_2O$:0–10
$Li_2O + Na_2O$:0.5–14
MgO:14–38
$B_2O_3$:0–15
$Al_2O_3$:0–10
$SiO_2$:35–70
F:5–15

The inventive process preferably comprehends the following required and optional steps:

(a) a crystal-containing body is formed wherein said crystals consist essentially of a lithium and/or sodium water-swelling mica selected from the group of fluorhectorite, hydroxyl hectorite, boron fluorphlogopite, hydroxyl boron phlogopite, and solid solutions among those and between those and other structurally-compatible species selected from the group of talc, fluortalc, polylithionite, fluorpolylithionite, phlogopite, and fluorphlogopite;

(b) said body is contacted with a polar liquid for a time sufficient to cause swelling and disintegration thereof accompanied with the formation of a gel;

(c) organic and/or inorganic fibers inert to said polar liquid are dispersed in a quantity of said polar liquid or another polar liquid which is miscible with said polar liquid;

(d) either said gel or an ion exchangeable compound selected from the group of an organic polycation, an aminosilane, and an organic chrome complex or a mixture of said gel and said ion exchangeable compound is blended into said dispersion of fibers;

(e) where a mixture of said gel and said ion exchangeable compound was not blended into said dispersion of fibers in Step (d), either said gel or said ion exchangeable compound, whichever ingredient was not blended into said dispersion of fibers in Step (d) is blended into said dispersion of fibers, the combination of said gel and said ion exchangeable compound causing an ion exchange reaction to take place between the interlayer $Li^+$ and/or $Na^+$ ions in the crystals of said gel and cations from said ion exchangeable compound resulting in a reaction product of a floc;

(f) excess liquid is removed from said fiber/floc dispersion to yield a wet mass;

(g) said wet mass is optionally washed;

(h) said wet mass is dried and cured.

Drying and curing are conveniently undertaken in air, care being taken to essentially completely dry the mass at temperatures sufficiently low to avoid the development of bubbles prior to curing the mass. Curing will be conducted at temperatures below the degradation temperature of the ion exchangeable compound. Normally, satisfactory curing can be secured at temperatures no higher than 150° C.

Inasmuch as the flocs are formed in the presence of the fibers, fiber entanglement occurs and what has been termed fiber/floc agglomerates are produced. A high percentage of the binder is retained in the entangled fibers.

The fiber/floc mixture will be dispersed into a body of a predetermined geometry. For example, the fiber/floc mixture may be drained on a screen to form a mat. Where desired, that mat may be pressed to a denser state and excess liquid may be removed utilizing a vacuum. Boards, tiles, etc., can be fashioned from the mat. Other body configurations amenable to formation through conventional ceramic product forming techniques are possible. This embodiment of the inventive method is especially adaptable to the continuous production of sheet utilizing the wellknown Fourdrinier process.

In another embodiment of the general inventive method, a wet mass of fibers in polar liquid is formed and gel is brought into contact with that mass to impregnate it, the crystals in the gel forming a coating on the fibers. After removing excess liquid, the ion exchangeable compound is brought into contact with the gel-impregnated mass to impregnate it and cause the ion exchange reaction to occur. The doubly impregnated mass can be optionally washed and then dried and cured.

This sequence of steps is quite applicable for the production of flat articles, such as tile, but lacks flexibility in shaping more complex configurations. Furthermore, the method is not readily amenable to the continuous production of sheet as, for example, utilizing the Fourdrinier process.

However, because the ion exchange reaction is carried out directly at the site of application, viz., in the presence of the fibers, good bonding of the fibers is secured which leads to a final product demonstrating high mechanical strength.

As is described above in the description of the overall general method, it is possible to mix the gel and ion exchangeable compound (forming a floc) and then blend that mixture into the dispersion of fibers. After optionally washing the mass resulting from the fiber/floc dispersion, it can be dried and cured.

The sequence of steps in this embodiment of the inventive method allows great flexibility in the shaping of final products of widely-varying configurations, including the use of the Fourdrinier process for forming sheet. Nevertheless, because the ion exchange reaction is not carried out in situ in the presence of the fibers, the final products resulting therefrom do not have quite the mechanical strength and thermal stability exhibited by articles prepared in accordance with the first two above-described embodiments of the invention.

In order to insure good bonding of the fibers with the consequent production of a strong final product, at least about 5% by weight of binder will be present. Very high loadings of binder may be incorporated but to no practical advantage, and greatly increase the cost of the product. Accordingly, loadings of about 10–20% are preferred.

The invention will now be described by means of the following working examples which must be deemed illustrative only of the inventive process and in no way limiting.

DESCRIPTION OF PREFERRED EMBODIMENTS

In Examples 1 and 2, a glass-ceramic body having a composition approximating Example 14 of U.S. Pat. No. 4,239,519 (the preferred composition of that patent) was utilized as a starting material. In preparing that glass-ceramic, a glass body having the following approximate composition, expressed in terms of weight percent on the oxide basis as calculated from the batch, of $SiO_2$:64.5
MgO:10.8
$Li_2O$:8.0
$MgF_2$:16.7 was exposed to a temperature of about 700° C. for about four hours to yield a highly crystalline article containing very uniformly-sized lithium fluorhectorite as the predominant crystal phase.

KYMENE 557H was found to be the preferred source of organic polycations and, hence, was utilized in the examples. Nevertheless, it will be appreciated that the other organic cations disclosed in Ser. Nos. 461,672 and 461,571 are also operable.

Finally, whereas organic and inorganic fibers of all types can be operable in the inventive process, cellulose fibers and mineral wool are especially desirable in yielding a very strong final product. Although the mechanism acting to impart the greater strength is not fully understood, it is believed that the organic polycations react with the cellulose fibers and mineral wool to improve the bonding and thereby enhance the mechanical strength of the product. Mineral wool was employed in each of the following examples since it imparts higher use temperature capability to a product than does the incorporation of cellulose fibers. Mineral wool is a frequent component in ceiling and acoustic tile.

EXAMPLE 1

160 grams of mineral wool were dispersed into 7 liters of deionized water and mixed thoroughly for 2 minutes. 240grams of 3 % KYMENE 557 H solution (7.2 grams dry solids) were added to the slurry and mixed thoroughly for 1 minute. 192 grams of gel (7.5% solids solution—14.4 grams dry solids), prepared by immersing the above-described glass-ceramic into water, were charged into the slurry and thoroughly mixed for 2 minutes.

The slurry was poured onto a No. 100 United States Standard Sieve (149 microns) and allowed to drain therethrough. A vacuum was subsequently applied for 2 minutes to draw off the excess water. A tile having a thickness of about 2.3 cm was formed which was thereafter air dried and cured in a heating chamber utilizing the following schedule:

Overnight at 60°0 C.
1 hour at 80° C.

1 hour at 100° C.
2 hours at 120° C.

The tiles demonstrated an average modulus of rupture at ambient temperature and 50% relative humidity of about 180 psi, and a modulus of rupture at 40° C. and 80% relative humidity of about 110 psi. Whereas the tiles manifested some decrease in mechanical strength at the higher temperature and humidity levels, the values are above the minimum strengths demanded for many applications (e.g., 100 psi for ceiling tiles).

EXAMPLE 2

160 grams of mineral wool were dispersed into 7 liters of deionized water and mixed thoroughly for 4 minutes. The slurry was poured onto a No. 100 United States Standard Sieve, allowed to drain, the top surface thereof gently patted with a flat plate to render it smooth and level, and a vacuum applied for 1 minute to draw off the excess water, thereby forming a fibrous mat.

710 grams of gel (7.5% solids solution—53.3 grams dry solids), prepared by immersing the above-described glass-ceramic into water, were poured onto the fibrous mat and allowed to rest upon and soak therein for 2 minute. A vacuum was applied for 1 minute to draw the gel through the mat.

950 grams of 6% KYMENE 557H solution (57 grams dry solids) were poured onto the mat and permitted to rest upon and soak therein for 5 minutes. The impregnation of the mat by the gel was advanced by applying a vacuum for 3 seconds and then allowing the mat to rest for 1 minute. That sequence was repeated. After the second 1-minute rest, the vacuum was applied for 2 minutes and the mat then permitted to be at rest for the final 1 minute. A tile having a thickness of about 1.5 cm was found.

The following procedure was employed to rinse the tile:

500 ml deionized water were poured onto the mat.
A vacuum was applied for 30 seconds.
The above sequence of steps was repeated 6 times.
A vacuum was applied for 2 minutes.

The tiles were air dried as above in Example 1. The final bodies exhibited an average modulus of rupture at ambient temperature and 50% relative humidity of about 220 psi, and a modulus of rupture at 40° C. and 80% relative humidity of about 150 psi. It is quite evident that the mechanical strengths of the instant products exceed the conventional minima.

As has been discussed above, articles can be formed by blending the gel and KYMENE solution together to produce floc and the mat then impregnated with the floc. However, the strength demonstrated by such articles has commonly been found to be somewhat less than when the gel and KYMENE solution are applied seriatim to the fibrous mat. The reason for this apparent lower strength has not been fully elucidated. It has been conjectured that impregnating the mat with floc results in simple mechanical intertwining of the floc and fibers whereas, when flocculation is carried out in situ among the fibers, the floc tends to coagulate around the fibers, thereby providing a stronger bond. It must also be appreciated that KYMENE polymerizes with hydroxyl groups. Cellulose has available OH$^-$ groups . Accordingly, KYMENE can bond directly to cellulose fibers.

Tiles were formed therefrom following the process described above in Example 1 utilizing mineral wool as the fiber component and ion exchanging the above synthetic mica with a 3% KYMENE 557H solution to form the binder, the binder being present in an amount of about 13% by weight. The tiles exhibited an average modulus of rupture of 326 psi at ambient temperature and 50% relative humidity and an average modulus of rupture of 246 psi at 38° C. and 80% relative humidity.

As can be observed, there is a sharp decrease in mechanical strength ($\sim$25%) evidenced when these tiles were exposed to higher temperatures and humidities. Nonetheless, the final value is well above the minimum 100 psi discussed above.

EXAMPLE 3

A batch consisting of 10.9 parts by weight $SiO_2$, 24 parts by weight talc, 14.2 parts by weight $MgSiF_6 \cdot 6H_2O$, and 13.1 parts by weight $LiOH \cdot H_2O$ was compounded and fired to sintering. The sintered material had a composition approximating the stoichiometry of $LiMg_2LiSi_4O_{10}F_2 \cdot (0.25)LiF$. Upon immersion into water, a gelatinous suspension formed containing about 10% by weight solids which was filtered through a No. 200 United States Standard Sieve (74 microns) to remove impurities.

EXAMPLE 4

A batch consisting of 11.4 parts by weight of $SiO_2$, 20.3 parts by weight of talc, 22.8 parts by weight of $MgSiF_6 \cdot 6H_2O$, and 21 parts by weight of $LiOH \cdot H_2O$ was compounded and sintered to yield a material having a stoichiometry approximating (LiF) ($LiMg_2LiSi_4O_{10}F_2$). Tiles were made therefrom in the manner described in Example 1 again utilizing mineral wool as the fiber component and ion exchanging the above synthetic mica with a KYMENE 557H solution to serve as the binder, the binder being included in an amount of about 9.8% by weight. The tiles demonstrated an average modulus of rupture of 450 psi at ambient temperature and 50% relative humidity and 254 psi at 38° C. and 80% relative humidity.

As can be observed from the above examples, the method employed to prepare the synthetic water-swelling mica is not a primary factor to be considered in producing articles in accordance with the instant invention. Nevertheless, the method utilized may impact significantly the final physical characteristics of the products because of effects which the synthetic processing may have upon the properties of the synthetic mica. However, the formation of the strong bonding medium is the result of the ion exchange reaction taking place between the synthetic water-swelling mica particles and the organic polycations, an aminosilane, and/or organic chrome complex. The overall effectiveness of the bond is determined by the morphology, size, and layer charge of the synthetic mica, along with the hydrophobicity of the binder materials.

We claim:

1. An article exhibiting good heat stability and a high mechanical strength as evidenced by a modulus of rupture greater than 100 psi which is relatively insensitive to changes in the relative humidity of the surrounding environment consisting essentially of:
   (a) organic and/or inorganic fibers; and
   (b) at least 5% by weight of a binder in the form of floc composed of a product of an ion exchange reaction between
   (I) crystals of a lithium and/or sodium water-swelling mica selected from the group of fluorhectorite, hydroxyl hectorite, boron fluorphlogopite, hydroxyl boron phlogopite, and solid solutions among those and between those and other structurally-compatible species selected from the group of talc, fluortalc, polylithionite, fluorpolylithionite, phlogopite, and fluorphlogopite; and (II) an organic polycation, and/or an aminosilane, and/or an organic chrome complex;

said high mechanical strength being the result of the structure of said articles consisting of fibers entangled in fiber/floc agglomerates, those agglomerates retaining a high percentage of said binder, and a reaction occurring between said organic polycation and/or said aminosilane and/or said organic chrome complex and said fibers.

2. An article according to claim 1 wherein said fibers are selected from the group of mineral wool and cellulose fibers.

3. An article according to claim 1 wherein said crystals of water-swelling mica are relatively uniformly-sized and wherein at least a substantial portion of which displays a morphology of a continuum of flakes, rectangular-like strips, and interwoven ribbons in parallel or sub-parallel zones or sheaths.

4. An article according to claim 3 wherein said flakes are irregularly shaped with diameters between about 0.5–10 microns and cross-sections of less than about 100Å, and said strips and ribbons are about 0.5–10 microns in length, about 500Å–5000Å in width, and less than about 100Å in thickness.

5. An article according to claim 1 wherein said organic polycation is selected from the group of:
 (a) a primary amine solubilized with acid;
 (b) a secondary amine solubilized with acid;
 (c) a tertiary amine solubilized with acid;
 (d) a quaternary ammonium acid salt;
 (e) a quaternary phosphonium acid salt; and
 (f) a ternary sulfonium acid salt.

6. An article according to claim 1 wherein said aminosilane is N-$\beta$-aminoethyl-$\gamma$-aminopropyl trimethoxy silane.

7. An article according to claim 1 wherein said organic chrome complex is selected from the group of a chemically reactive Werner complex in which a $C_{14}$–$C_{18}$ fatty acid is coordinated with trivalent chromium, and a chemically reactive Werner complex, methacrylato chromic chloride, wherein methacrylic acid is coordinated with chromium.

* * * * *